Patented Feb. 13, 1951

2,541,961

UNITED STATES PATENT OFFICE 2,541,961

HETEROCYCLIC QUATERNARY AMMONIUM PENTACHLOROPHENATES

Sivert N. Glarum, Wyncote, Pa., and Alva L. Houk, San Luis Obispo, Calif., assignors to Röhm & Haas Company, Philadelphia, Pa., a corporation of Delaware No Drawing. Application October 22, 1946, Serial No. 704,986

6 Claims. (Cl. 260—247.7)

This invention deals with quaternary ammonium compounds having as an anion a pentachlorophenate group. It further deals with methods whereby these compounds may be prepared. In particular, the present application is directed to quaternary ammonium pentachlorophenates having nitrogen in a heterocycle and is a continuation-in-part of our application Serial No. 502,049, filed September 11, 1943.

We have found that certain of these quaternary ammonium pentachlorophenates may be prepared by heating together a heterocyclic amine having a saturated ring which includes a tertiary nitrogen atom with the methyl or a benzyl ether of pentachlorophenol, for example, illustrating the reaction with substituted morpholine,

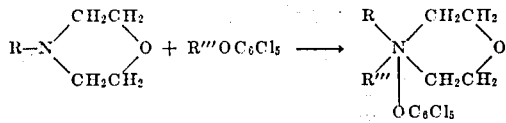

wherein R''' is a methyl or a benzyl group, including such substituted benzyl groups as chlorobenzyl, nitrobenzyl, and methylbenzyl, and R is an aliphatic, alicyclic, or arylaliphatic group, such as methyl, ethyl, propyl, isopropyl, butyl, isobutyl, amyl, hexyl, octyl, decyl, undecenyl, dodecyl, cetyl, octadecyl, octadecenyl, butoxymethyl, butoxyethyl, butoxybutyl, benzyl, methylbenzyl, tert.-butylbenzyl, phenoxyethyl, chlorophenoxyethyl, nitrophenoxyethyl, naphthoxyethyl, phenoxyethoxyethyl, 1,1 3,3-tetramethylbutylphenoxyethoxyethyl, phenoxypropyl, phenoxypropoxypropyl, decylphenoxyethyl, cyclohexyl, methylcyclohexyl, acyloxyalkyl, including acetyloxyethyl, acetyloxypropyl, butyryloxyethyl, hexanoyloxyethyl, lauroyloxyethyl, stearoyloxyethyl, and the like. When the group R contains more than six carbon atoms, the resulting quaternary ammonium compounds exhibit capillary activity.

By a preferred method, a tertiary amine of the formula $$R-N\diagdown_{R''}^{R'}$$

wherein R' and R'' together form a divalent group which jointly with the nitrogen forms a heterocycle, illustrated by —CH$_2$CH$_2$OCH$_2$CH$_2$—, —CH$_2$CH$_2$SCH$_2$CH$_2$—, —CH$_2$CH$_2$CH$_2$CH$_2$CH$_2$—, and CH$_2$CH$_2$CH$_2$CH$_2$—, is heated with an ether of the formula

R'''OC$_6$Cl$_5$ at a temperature between about 80° C. and about 180° C. with or without an organic solvent under normal, reduced, or increased pressure. The compound formed in the reaction may be purified by stripping off volatile material, by treating with an absorbent such as charcoal, by crystallizing, or by following other conventional purification steps.

While the above method constitutes a preferred one, quaternary ammonium compounds having a pentachlorophenate anion may also be prepared by metathesis between a quaternary ammonium salt of a strong acid, such as chloride, bromide, or sulfate, and a soluble salt of pentachlorophenol, such as sodium or potassium pentachlorophenate. The metathesis may take place in an aqueous system or in a system with an organic solvent and the salts formed by metathesis separated.

Yet another method of preparation of quaternary ammonium pentachlorophenates, although one of somewhat limited scope because of lack of availability of starting materials, is the direct reaction of a quaternary ammonium hydroxide and pentachlorophenol.

By the above methods there may be obtained practically any type of quaternary ammonium pentachlorophenate. These are all new compounds having valuable properties which make them useful as disinfectants, bactericides, fungicides, textile assistants, and finishing agents, wetting agents, emulsifiers, etc.

The reaction involved for preparing heterocyclic quaternary ammonium compounds through metathesis may be illustrated as follows, using piperidines as typical amines and sodium pentachlorophenate as a typical soluble salt of this phenol,

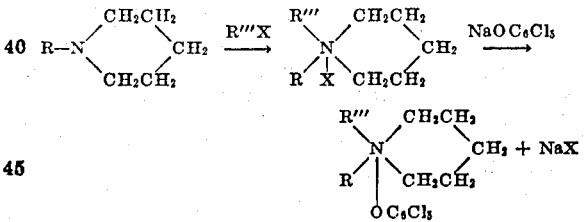

The new compounds of the formula

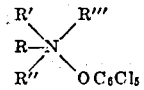

wherein R' and R'' form a heterocycle with the nitrogen and together represent a saturated divalent hydrocarbon or ether chain, are of considerable interest. R may be any of the groups indicated above in connection with the first-mentioned method of synthesis and may also be allyl, methallyl, benzyl, or other monovalent aliphatic, alicyclic, heterocyclic, or arylaliphatic group. R''' may be not only the methyl or benzyl group supplied by the pentachlorophenyl methyl or benzyl ethers but also any of the aliphatic or arylaliphatic groups which are introduced by so-called alkylating agents during the formation of a quaternary ammonium salt prior to the step of metathesis with a soluble salt of pentachlorophenol. These agents include such compounds as methyl bromide, methyl iodide, methyl sulfate, ethyl bromide, ethyl sulfate, benzyl chloride, alkylbenzyl halides such as butylbenzyl bromide, halobenzyl chloride or bromide, nitrobenzyl chloride, haloacetates, including methyl, ethyl, or butyl α-chloroacetate, methyl formate, chloroacetone, allyl bromide, methallyl bromide, alkoxymethyl halides, represented by butoxymethyl chloride, octoxymethyl bromide, or dodecyloxymethyl chloride, etc. These agents thus supply such groups as methyl, ethyl, benzyl, carbmethoxymethyl, carbethoxymethyl, 2-ketopropyl, allyl, methallyl, alkoxymethyl, etc. The strong anion or anionic group supplied by such agents is, of course, replaced by the pentachlorophenate group during metathesis, while the organic radical, usually an aliphatic or arylaliphatic group, remains attached to the nitrogen.

Thus, there may be obtained such quaternary ammonium compounds as:
Butyl methyl piperidinium pentachlorophenate
Heptyl methyl morpholinium pentachlorophenate
Dodecyl methyl pyrrolidinium pentachlorophenate
Cetyl methyl thiomorpholinium pentachlorophenate
Octadecyl benzyl morpholinium pentachlorophenate
Iso-octyl benzyl pyrrolidinium pentachlorophenate
Dodecyloxymethyl ethyl morpholinium pentachlorophenate
Dodecyloxyethyl methyl morpholinium pentachlorophenate
Dodecyloxypropyl benzyl morpholinium pentachlorophenate
Stearoyloxyethyl methyl morpholinium pentachlorophenate
Butyryloxyethyl benzyl morpholinium pentachlorophenate
Undecenoyloxyethyl methyl piperidinium pentachlorophenate
Allyl decyl morpholinium pentachlorophenate
Carbethoxymethyl dodecyl morpholinium pentachlorophenate
Dodecyl 2-ketopropyl piperidinium pentachlorophenate
Cetyl chlorobenzyl morpholinium pentachlorophenate
Octadecyl nitrobenzyl piperidinium pentachlorophenate
Cetyl methylbenzyl morpholinium pentachlorophenate
Stearoyloxyethyl methyl thiomorpholinium pentachlorophenate
Diisobutylphenoxyethoxyethyl ethyl morpholinium pentachlorophenate
  or
Cyclohexyl octyl morpholinium pentachlorophenate The quaternary ammonium compounds of this invention are readily absorbed from their solutions by textile fibers, particularly by fibrous cellulosic materials, and are tenaciously retained thereby. Fibers so treated resist attack by fungi and bacteria very effectively. Fabrics, whether woven, knitted, or felted, can be protected thereby against rotting and tendering. When the compound used for treating fibrous products has more than six carbon atoms in the substituent R, the compound is fairly well retained. Compositions containing ¼% or more of one of the compounds of this invention are particularly useful for mildewproofing cotton fabrics such as canvas or Osnaburg, jute fabrics, fabrics of other cellulosic fibers, or other types of fibers, including wool, which may be exposed to conditions favoring the growth of fungi thereon.

This invention is illustrated by the following examples of the preparation of quaternary ammonium salts having as an anion a pentachlorophenate group.

*Example 1*

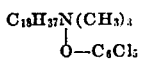

A mixture of 84 parts of pentachloroanisole and 96 parts of octadecyl dimethylamine was stirred at 140° C. for nine hours. Titration of the amine showed that 99% had reacted. The solid product was crystallized from methyl ethyl ketone. By analysis the product was found to contain 28.05% of chlorine. Theory is 30.7%.

*Example 2*

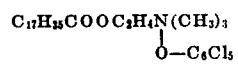

A mixture of 38 parts of dimethylaminoethyl stearate and 28 parts of pentachloroanisole was stirred at 150° C. for twelve hours. Titration of the amine showed that reaction was 90% complete.

*Example 3*

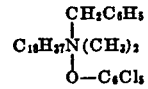

A mixture of 35 parts of octadecyl dimethylamine and 36 parts of pentachlorophenylbenzyl ether was heated at 170° C. for four hours. The product crystallized on cooling. It is very slightly soluble in water but soluble in alcohol.

*Example 4*

The above compound was also prepared by the following method: Solutions were prepared by dissolving 212 parts of octadecyl dimethyl benzyl ammonium chloride in 1500 parts of water and adding thereto a solution of 144 parts of sodium pentachlorophenate in 1500 parts of water. An oily precipitate formed which was separated and dried in vacuo. The yield was 280 parts of solid product.

*Example 5*

A solution of octadecyl trimethyl ammonium pentachlorophenate (described above) was prepared by mixing a solution of 70.5 parts of octadecyl trimethyl ammonium chloride in 200 parts of water with a solution of 58 parts of sodium pentachlorophenate in 244 parts of water. A thick paste resulted which could be diluted to a clear aqueous solution.

Example 6

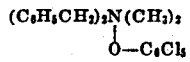

A solution was prepared by dissolving 66 parts of pentachlorophenol in a mixture of 125 parts of a 2.0 normal solution of dimethyl dibenzyl ammonium hydroxide, 285 parts of water, and 320 parts of ethanol. The resulting solution contained 15% quaternary ammonium pentachlorophenate.

Example 7

A mixture of 142 parts of stearic acid, 73 parts of morpholinoethanol, and eighty parts of toluene was stirred and refluxed with a device for removing water from the condensed vapors. After eight parts of water had been removed, the toluene was distilled off under vacuum, leaving 212 parts of solid residue which by titration contained 5% stearic acid, the remainder being stearoyloxyethyl morpholine.

Eighty-three and six-tenths parts of the stearoyloxyethyl morpholine, 25 parts of ethanol, and 29 parts of methyl iodide were stirred for two hours at 80° C. The expected quaternary ammonium salt was thus formed and was crystallized from methyl ethyl ketone in a yield of 63 parts.

The product was methyl stearoyloxyethyl morpholinium iodide. It melted at 115°–124° C.

Fifty-three and five-tenths parts of the above crystals was dissolved in 160 parts of water and added to a solution of 29.9 parts of sodium pentachlorophenate in 58 parts of water. A liquid layer separated which contained 22.39% solids.

The compound obtained from this layer had the formula

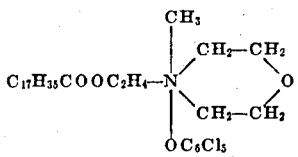

Example 8

A mixture of 280 parts of octadecylamine, 375 parts of ethanol, 110 parts of sodium carbonate, and 143 parts of β-β′-dichlorodiethyl ether was stirred and refluxed for eight hours. The ethanol was removed by distillation and the product was washed with water. It was distilled under vacuum and a fraction was collected at 166°–193° C./4 mm. This fraction corresponded in composition to octadecyl morpholine. It had an apparent molecular weight of 347 by titration with standard acid, compared with a theoretical weight of 339 for octadecyl morpholine.

Ninety parts of the above amine was mixed with fifty parts of isopropanol and 38 parts of methyl iodide, and the mixture was stirred for two hours at 80° C. After the isopropanol had been distilled off under reduced pressure, a syrup remained which was completely soluble in water.

Seventy-seven parts of the octadecyl morpholinium iodide thus prepared was dissolved in 142 parts of water and 31.2 parts of sodium pentachlorophenate was added. The mixture was warmed to 90° C. and a heavy liquid layer separated which contained 40% solids. The residue obtained from this layer had the composition:

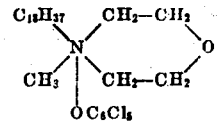

The preferred compounds of this invention are those chlorophenates in which there occurs one N-substituent of twelve to eighteen carbon atoms in an aliphatic hydrocarbon group. These compounds in one or two per cent solutions are especially effective in preventing growth of molds and are well retained on fabrics under conditions where leaching may occur.

In general, the compounds of this invention are soluble in water or in mixtures of water and an organic solvent miscible therewith, such as alcohol or acetone. Many compounds are also soluble in organic solvents themselves, such as naphtha, benzene, alcohol, acetone, or the like.

The compounds are conveniently applied to fabrics from solutions, particularly aqueous solutions. After excess solution has been removed therefrom, the fabrics are dried. Fabrics treated in this way are highly resistant to mildewing and tendering under conditions of severe exposure. In confirmation of this, there are here presented results of mildew tests with a variety of compounds falling within the above general formula.

The tests were made under carefully controlled conditions and were designed to show not only growth or lack of growth of specific fungi but also the effect on the cloth itself. In general, the test methods used followed those prescribed in Tentative Specifications of the Corps of Engineers, United States Army, T-1452, as amended June 10, 1941, and January 12, 1942.

A small strip of treated cloth was sterilized under fifteen pounds steam pressure and placed in a test tube containing sterile agar with nutrient salts. The agar was then inoculated with one-half to three-quarters of a milliliter of a suspension of spores of a selected fungus. The tube was stoppered with a cotton plug and placed in an incubator maintained at 90° F. for a week. Observations were then made as to growth or lack of growth. In many cases, the tensile strength of the strip was determined.

The tests were compared against control strips. Strips of the original fabric, but untreated with mildewproofing agent, were tested along with strips of treated fabric to make sure that copious growth of fungi occurred. Also, blank strips were given all of the handling and passed through all of the procedural steps except that these strips were not inoculated with spores in order to determine what effect the procedure itself and the chemical agents might have. Another set of tests was also made with strips which were leached in a stream of tap water for twenty-four hours. These were squeezed, sterilized, and tested by the procedure described above.

Details of typical tests are given below:

A. Cotton Osnaburg was passed through a 1% solution of $C_{18}H_{37}(CH_3)_3NOC_6Cl_5$ in water, squeezed to 100% take-up of solution, and dried. Strips of this treated fabric were then tested with Metarrhizium sp.,[1] *Chaetomium globosum*, and *Aspergillus niger*, respectively. No growth oc- ---
[1] This organism has been recognized as *Metarrhizium glutinosum*, Circular No. 737, U. S. D. A., September, 1945, page 2.

curred in one week on any strip. No growth occurred on strips which were leached. The strips all showed excellent retention of tensile strength.

Tests were repeated on a 48 x 48 cotton sheeting. Whether unleached or leached, the strips showed no growth and retained their tensile strength well.

Controls with strips subjected to agar but lacking the quaternary ammonium pentachlorophenate supported a large, flourishing growth and with Metarrhizium and Chaetomium lost all tensile strength. Controls subjected to procedural steps, but not inoculated with spores, retained essentially their initial breaking strength. These results were repeated in each of the following tests.

B. A 1% solution of

C$_8$H$_{17}$C$_6$H$_3$(CH$_3$)OC$_2$H$_4$OC$_2$H$_4$
$\diagdown$
N—OC$_6$Cl$_5$
$\diagup$ $\diagdown$
C$_6$H$_5$CH$_2$    CH$_3$ in denatured alcohol was applied to both Osnaburg and 48 x 48 sheeting. The cloth was squeezed to leave about a 100% take-up and dried. Strips of the two types of cloth were tested as above with Metarrhizium. No growth whatsoever occurred on unleached specimens, and the tensile strength of these strips was fully retained. The leached strips, however, permitted some growth. The compound used here has considerable solubility, and it should also be noted that leachfastness was generally not so good for cloth treated from solvent solutions as from water.

Controls treated with denatured alcohol without quaternary compound and dried supported a vigorous growth when inoculated and lost all breaking strength. Controls not inoculated retain essentially their original strength.

C. The compound

C$_{18}$H$_{37}$   CH$_3$
$\diagdown$ $\diagup$
N—OC$_6$Cl$_5$
$\diagup$ $\diagdown$
C$_6$H$_5$CH$_2$    CH$_3$ was tested at two levels of concentration, 1% and 2%, in alcoholic solutions. No growth occurred on strips of unleached Osnaburg with Metarrhizium sp., *Chaetomium globosum*, or *Aspergillus niger*. A trace of growth was noted on leached strips with *Aspergillus niger* and Chaetomium, but the tensile strength was little changed. Tests with 48 x 48 cotton sheeting in general confirmed the findings with Osnaburg, although there was an increased tendency for leaching of agent to occur with this fabric and a concomitant tendency for the fabric to be attacked.

D. The compound C$_{12}$H$_{25}$(CH$_3$)$_3$N—OC$_6$Cl$_5$ was applied from a 1% solution in alcohol. Strips of both Osnaburg and sheeting were tested against Metarrhizium sp., and such compound was found to prevent the growth of fungus thereon. These strips retained at least 90% of their strength during the test.

E. A 1% aqueous solution of

C$_6$H$_5$CH$_2$(CH$_3$)$_3$NOC$_6$Cl$_5$ was applied to both Osnaburg and 48 x 48 sheeting, as in previous tests. Strips tested against Metarrhizium sp. showed no growth and retained practically their full strength. The impregnated but leached strips were resistant to the growth of this organism but lost somewhat in tensile strength.

F. A 1% solution of (C$_6$H$_5$CH$_2$)$_2$(CH$_3$)$_2$NOC$_6$Cl$_5$ was made in a mixture of three parts of water and one part of alcohol. This was applied to both Osnaburg and sheeting in the usual way. Unleached strips were completely resistant to the growth of Metarrhizium sp. Leached strips of impregnated Osnaburg, while permitting a rather copious growth, retained at least 90% of their tensile strength.

G. A 1% solution of

C$_{18}$H$_{37}$   CH$_3$
$\diagdown$ $\diagup$
N—OC$_6$Cl$_5$
$\diagup$ $\diagdown$
CH$_2$—CH—CH$_2$   CH$_3$
$\diagdown$ $\diagup$
O in alcohol was applied to both Osnaburg and 48 x 48 cotton sheeting, the excess solution removed to leave 100% take-up of solution, and the impregnated cloths dried. No growth of Metarrhizium sp. was observed on test strips and at least 90% of the tensile strength was retained by these test strips. Some growth occurred on leached strips with the same fungus with concomitant partial loss of strength.

H. A 1% solution of

C$_{18}$H$_{37}$   CH$_3$
$\diagdown$ $\diagup$
N—OC$_6$Cl$_5$
$\diagup$ $\diagdown$
CH$_2$=C—CH$_2$   CH$_3$
$\vert$
CH$_3$ in alcohol was used as in the previous example. Neither leached nor unleached strips of 48 x 48 cotton sheeting supported any growth of Metarrhizium sp. There was no growth on unleached Osnaburg, but slight growth on leached Osnaburg.

I. Tests on wool suiting were made with a product prepared by metathesis from equal parts by weight of p-tert.-octyl-phenoxyethoxyethyl dimethyl benzyl ammonium chloride, sodium pentachlorophenate, and alcohol. A solution of 1.5% of the crude reaction product was made in water and applied to the suiting, which was then squeezed to a 100% take-up, and dried. Against Metarrhizium sp. unleached pieces permitted but a trace of growth and leached pieces but slight growth while, on control samples, a copious growth occurred. These results were duplicated with *Chaetomium globosum*.

J. A 1% dispersion of the compound obtained in Example 7 was applied to strips of Osnaburg and muslin fabrics and tested as above with both Metarrhizium and Chaetomium. No growth occurred on leached or unleached strips and there was little, if any, change in tensile strength.

K. A 1% dispersion of the product prepared in Example 8 was applied to strips of Osnaburg and muslin fabric which were tested against Metarrhizium. There was no visible growth on any of the strips, whether unleached or leached. Other strips were tested against *Aspergillus niger*. There was no evident growth on the Osnaburg strips, whether leached or unleached, nor growth on unleached muslin strips.

The new quaternary ammonium pentachlorophenates are highly effective mildew resisting compounds for use on textile fibers. They are superior to the quaternary ammonium salts of strong acids and to pentachlorophenol or its alkali salts, particularly in that the new compounds resist leaching and are effective where other organic compounds fail. Their capacity to combat growth on nitrogenous fibers is unusual and of considerable value.

A 1% solution of the long-chained quaternary ammonium pentachlorophenols applied to young saplings caused defoliation in a short time with eventual death of the trees, thus indicating a phytocidal property for the quaternary ammonium pentachlorophenates and the use of these compounds as herbicidal agents of considerable power.

We claim:

1. Quaternary ammonium pentachlorophenates of the formula

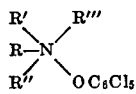

wherein R is a member of the class consisting of monovalent aliphatic hydrocarbon radicals of not over eighteen carbon atoms and beta-alkanoyloxyethyl groups in which the alkanoyl group contains not over eighteen carbon atoms, R' and R'' together form a saturated divalent group which forms a heterocycle with the nitrogen and which is a member of the class consisting of $-CH_2CH_2CH_2CH_2-$, $-CH_2CH_2CH_2CH_2CH_2-$, $-CH_2CH_2OCH_2CH_2-$, and $-CH_2CH_2SCH_2CH_2$, and R''' is a member of the class consisting of methyl and benzyl groups.

2. As a new chemical compound,

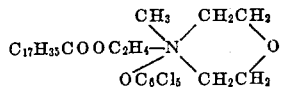

3. As a new chemical compound,

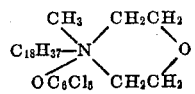

4. Quaternary ammonium pentachlorophenates of the formula

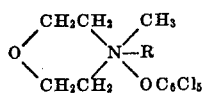

wherein R is an alkyl group of seven to eighteen carbon atoms.

5. Quaternary ammonium pentachlorophenates of the formula

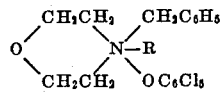

wherein R is an alkyl group of seven to eighteen carbon atoms.

6. Quaternary ammonium pentachlorophenates of the formula

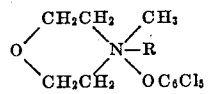

wherein R is a beta-alkanoyloxyethyl group in which the alkanoyl group contains not over eighteen carbon atoms.

SIVERT N. GLARUM.
ALVA L. HOUK.

REFERENCES CITED

The following references are of record in the file of this patent:

UNITED STATES PATENTS

| Number | Name | Date |
|---|---|---|
| 2,127,103 | Bruson | Aug. 16, 1938 |
| 2,191,922 | Bruson | Feb. 27, 1940 |
| 2,268,395 | Henke et al. | Dec. 30, 1941 |
| 2,295,504 | Shelton | Sept. 8, 1942 |